United States Patent
Jen et al.

(10) Patent No.: US 6,406,928 B1
(45) Date of Patent: Jun. 18, 2002

(54) BACK-CHANNEL-ETCH PROCESS FOR FORMING TFT MATRIX OF LCD WITH REDUCED MASKING STEPS

(75) Inventors: Tean-Sen Jen, Chiai; Dyi-Chung Hu, Hsinchu, both of (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 09/691,330

(22) Filed: Oct. 18, 2000

(30) Foreign Application Priority Data

Dec. 20, 1999 (TW) ........................................ 88122457 A

(51) Int. Cl.[7] .................... H01L 21/00; G02F 1/1343
(52) U.S. Cl. ................... 438/30; 938/29; 938/158; 938/160; 938/609; 938/384; 349/141; 349/38; 349/39; 349/42
(58) Field of Search .................... 438/384, 29, 30, 438/160, 158, 609, 22, 57; 349/141, 138, 42, 43, 133, 38, 39

(56) References Cited

U.S. PATENT DOCUMENTS

| 5,346,833 A | 9/1994 | Wu .................................. 437/4 |
| 5,478,766 A | 12/1995 | Park et al. ..................... 437/40 |
| 6,011,274 A | * 1/2000 | Gu et al. ....................... 257/59 |
| 6,022,753 A | * 2/2000 | Park et al. ..................... 438/30 |
| 6,097,454 A | * 8/2000 | Zhang et al. .................. 349/43 |
| 6,107,640 A | * 8/2000 | Park et al. ..................... 257/59 |
| 6,159,779 A | * 12/2000 | Huang et al. ................ 438/158 |
| 6,163,355 A | * 12/2000 | Chang et al. ................ 349/141 |
| 6,218,221 B1 | * 4/2001 | Sah ............................. 438/158 |
| 6,259,502 B1 | * 7/2001 | Komatsu ...................... 349/38 |
| 6,274,400 B1 | * 8/2001 | Jen ............................... 438/30 |

FOREIGN PATENT DOCUMENTS

JP 2000101091 A * 4/2000 ......... H01L/29/786

* cited by examiner

*Primary Examiner*—Matthew Smith
*Assistant Examiner*—Victor V. Yevsikov
(74) *Attorney, Agent, or Firm*—Michael Best & Friedrich LLC; J. Warren Whitesel

(57) ABSTRACT

A simplified BCE process for forming a thin film transistor matrix for a liquid crystal display is disclosed. By using a backside exposure technique, the masking step for patterning an etch stopper layer can be omitted. By forming a pixel electrode layer before a data metal layer, a remaining portion of the data metal layer surrounding the pixel electrode can function as a black matrix after properly patterning and etching the data metal layer. The in-situ black matrix exempts from an additional step of providing a black matrix and solves the problem in alignment.

13 Claims, 9 Drawing Sheets

BACK-CHANNEL-ETCH PROCESS FOR FORMING TFT MATRIX OF LCD WITH REDUCED MASKING STEPS

FIELD OF THE INVENTION

The present invention relates to a process for forming a thin film transistor (TFT) matrix for a liquid crystal display (LCD), and more particularly to a simplified back-channel-etch (BCE) process for forming the TFT matrix with reduced masking steps.

BACKGROUND OF THE INVENTION

For conventional manufacturing processes of a TFTLCD, six to nine masking steps are required for forming the TFT matrix. One of the processes, which is a 6-mask one, is illustrated as follows.

The conventional process includes steps of:
i) applying a first conductive layer onto a glass substrate 10, and using a first photo-masking and lithography procedure to pattern and etch the first conductive layer to form an active region 12 consisting of a scan line and a gate electrode of a TFT unit, as shown in FIG. 1A;
ii) sequentially forming an insulation layer 14, an amorphous silicon (a-Si) layer 16, an $n^+$ amorphous silicon layer 18 and a photoresist 19 on the resulting structure of FIG. 1A, as shown in FIG. 1B, and exposing the resulting structure from the back side of the substrate, as indicated by arrows, wherein a portion of the photoresist 19 above the region 12 is shielded by the region 12 from exposure so as to exhibit a self-aligned effect;
iii) etching off the exposed photoresist 19, portions of the layers 16 and 18 thereunder, and the remaining photoresist so that each of the remaining layers 16 and 18 has a shape substantially identical to the region 12, and using a second photo-masking and lithography procedure to pattern and etch the layers 16 and 18 again to isolate the TFT unit 11, as shown in FIG. 1C;
iv) using a third photo-masking and lithography procedure to further pattern and etch the layers 16 and 18 to form a tape automated bonding (TAB) contact window for the scan line (not shown);
v) applying an indium tin oxide (ITO) layer on the resulting structure of FIG. 1C, and using a fourth photo-masking and lithography procedure to pattern and etch the ITO layer to form a pixel electrode 20 by a single side of the TFT unit 11, as shown in FIG. 1D;
vi) applying a second conductive layer on the resulting structure of FIG. 1D, using a fifth photo-masking and lithography procedure to pattern and etch the second conductive layer to integrally form a data line 23, a first connection line 22a between the TFT unit 11 and the data line 23, and a second connection line 22b between the TFT unit 11 and the pixel electrode 20, and using the remaining second conductive layer as a shield to etch off a portion of the doped a-Si layer 18 between the connection lines 22a and 22b to separate the source/drain electrodes 111 of the TFT unit 11, as shown in FIG. 1E; and
vii) applying a passivation layer 24 on the resulting structure of FIG. 1E, and using a sixth photo-masking and lithography procedure to pattern and etch the passivation layer 24 to expose the TAB contact window for the scan line, create a TAB contact window for the data line (not shown), and create an opening window A for the pixel electrode 20, as shown in FIG. 1F.

As known, the count of photo-masking and lithography steps directly affects not only the production cost but also the manufacturing time. Moreover, for each photo-masking and lithography step, the risks of mis-alignment and contamination may be involved so as to affect the production yield. The complicated 6-mask process mentioned as above thus results in relatively high cost and relatively low yield.

For current techniques, the above steps ix) and vii) can be combined to achieve a 5-mask process owing to the improvement on material. That is, all the TAB contact windows can be formed by a single masking and patterning step.

In order to further reduce the count of photo-masking and lithography steps, many efforts have been made to develop new processes. For example, U.S. Pat. Nos. 5,346,833 and 5,478,766 issued to Wu and Park et al., respectively, disclose 3 and/or 4-mask processes for making a TFTLCD, which are incorporated herein for reference. It is to be noted that the 3-mask process for each of Wu and Park et al. does not include the step of forming and patterning of a passivation layer. If a passivation layer is required to assure of satisfactory reliability, the count of photo-masking and lithography steps should be four.

Although Wu and Park et al. disclose the processes of reduced masks, the use of the ITO layer, which is integrally formed with the ITO pixel electrode, as the connection line between the TFT unit and the data line limits the area of the TFTLCD due to the high resistivity of ITO.

SUMMARY OF THE INVENTION

Therefore, an object of the present invention is to provide a reduced mask process for forming a thin film transistor (TFT) matrix for a liquid crystal display (LCD), in which the count of photo-masking and lithography steps can be reduced to three.

Another object of the present invention is to provide a BCE process for forming a thin film transistor (TFT) matrix for a liquid crystal display (LCD), in which the connection line between a TFT unit and a data line has a relatively low resistivity compared to the ITO connection line so as to be suitable for a large-area TFTLCD.

Another object of the present invention is to provide a simplified process for forming a thin film transistor (TFT) matrix for a liquid crystal display (LCD), in which a part of data metal layer around a pixel electrode functions as a black matrix.

According to a first aspect of the present invention, a process for forming a thin film transistor (TFT) matrix for a liquid crystal display (LCD) includes steps of providing a substrate made of an insulating material; forming a first conductive layer on a first side of the substrate, and using a first masking and patterning procedure to remove a portion of the first conductive layer to define a scan line and a gate electrode of a TFT unit; successively forming an insulation layer, a semiconductor layer, a doped semiconductor layer, and a photoresist layer on the substrate with the scan line and the gate electrode; providing an exposing source from a second side of the substrate opposite to the first side by using the scan line and the gate electrode as shields to obtain an exposed area and an unexposed area; removing the photoresist layer, and the semiconductor layers of the exposed area so that the remaining portion of the semiconductor layers in the unexposed area has a specific shape similar to the shape of the scan line together with the gate electrode; successively forming a transparent conductive layer and a second conductive layer on the substrate, and using a second masking and patterning procedure to remove a portion of the transparent conductive layer and a portion of the second conductive layer to define a pixel electrode region and data and connection lines, respectively; removing another portion of the doped semiconductor layer with a remaining portion of the second conductive layer as shields to define source/drain regions; forming a passivation layer on the substrate, and using a third masking and patterning procedure to remove a portion of the passivation layer; and removing another portion of the second conductive layer with the patterned passivation layer as shields to expose the pixel electrode region.

When the exposing source is a light radiation, the insulating material is a light-transmitting material such as glass.

Preferably, each of the first and the second conductive layers is formed of chromium, molybdenum, tantalum, tantalum molybdenum, tungsten molybdenum, aluminum, aluminum silicide, copper, or a combination thereof.

Preferably, the insulation layer is formed of silicon nitride, silicon oxide, silicon oxynitride, tantalum oxide, aluminum oxide or a combination thereof.

Preferably, the etch stopper layer is formed of silicon nitride, silicon oxide, or silicon oxynitride.

Preferably, the semiconductor layer is formed of intrinsic amorphous silicon, micro-crystalline silicon or polysilicon, and the doped semiconductor layer is formed of highly doped amorphous silicon, highly doped micro-crystalline silicon or highly doped polysilicon.

Preferably, the transparent conductive layer is formed of indium tin oxide, indium zinc oxide or indium lead oxide.

Preferably, the passivation layer is formed of silicon nitride or silicon oxynitride.

Preferably, the third masking and patterning procedure additionally removes a portion of the semiconductor layer to define an isolation window.

Preferably, the third masking and patterning procedure additionally defines a plurality of TAB pad regions around the TFT matrix.

After the third masking and patterning procedure, it is preferred that a portion of the second conductive layer surrounding the pixel electrode remains as a black matrix.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following description of the preferred embodiment of this invention is presented herein for purpose of illustration and description only; it is not intended to be exhaustive or to be limited to the precise form disclosed.

Figure 1A:
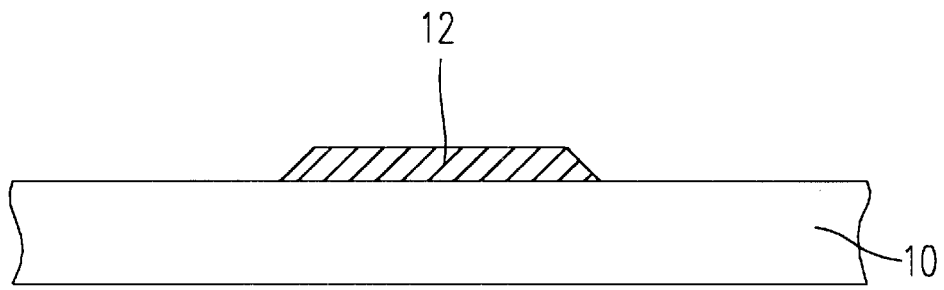
FIGS. 1A~1F are cross-sectional views of intermediate structures of a conventional TFTLCD, which schematically show the formation of the TFT matrix.
Figure 1B:
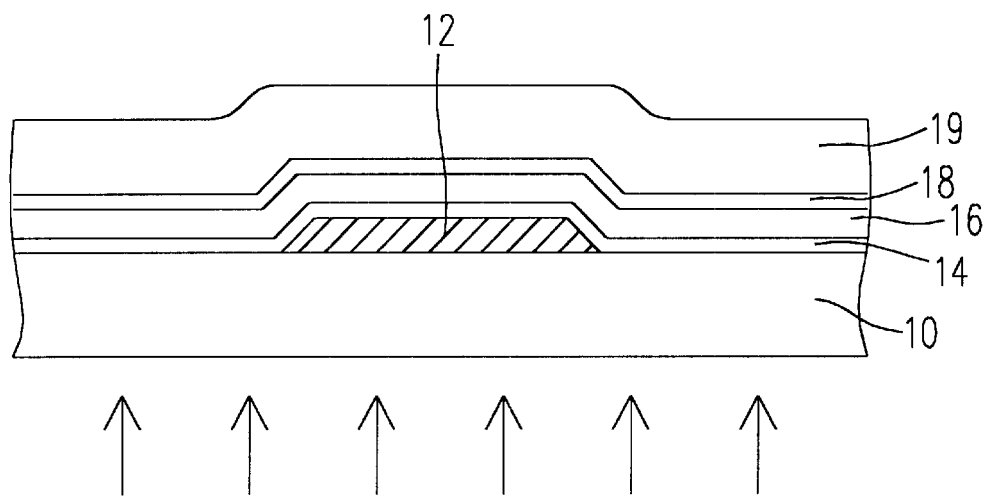
Figure 1C:
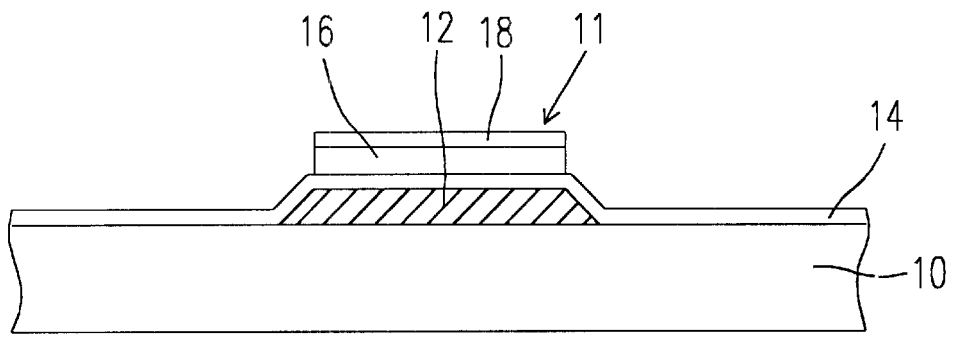
Figure 1D:
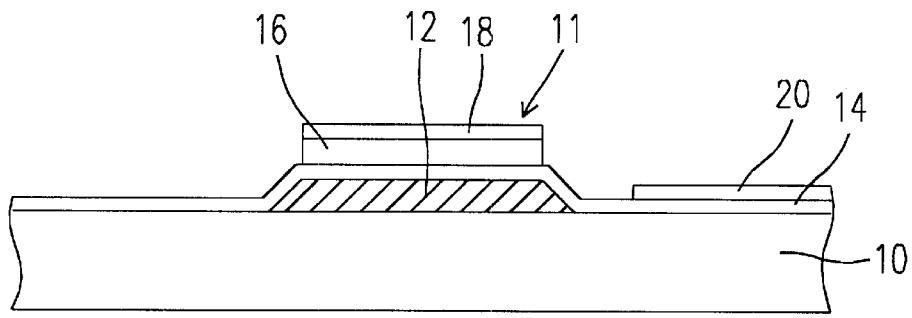
Figure 1E:
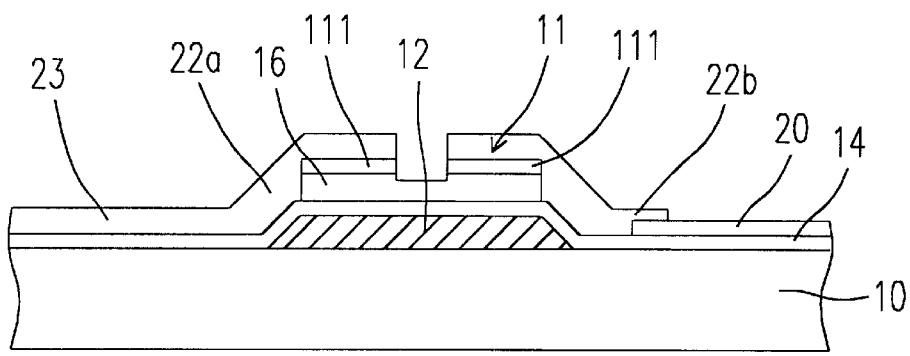
Figure 1F:
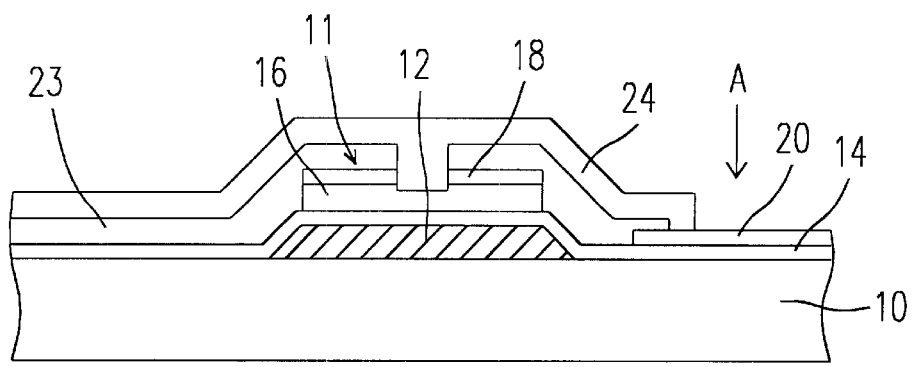
Figure 2A:
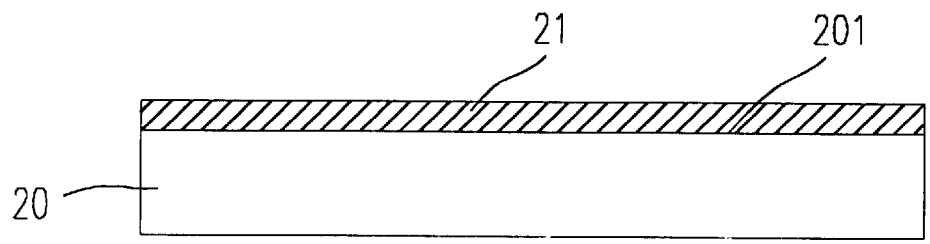
FIGS. 2A~2J are cross-sectional views of intermediate structures of a TFTLCD according to the present invention, which schematically show a preferred embodiment of a process for forming the TFT matrix.
Figure 2B:
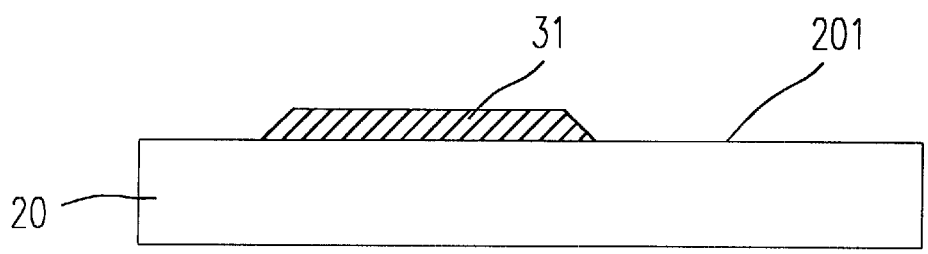
Figure 2C:
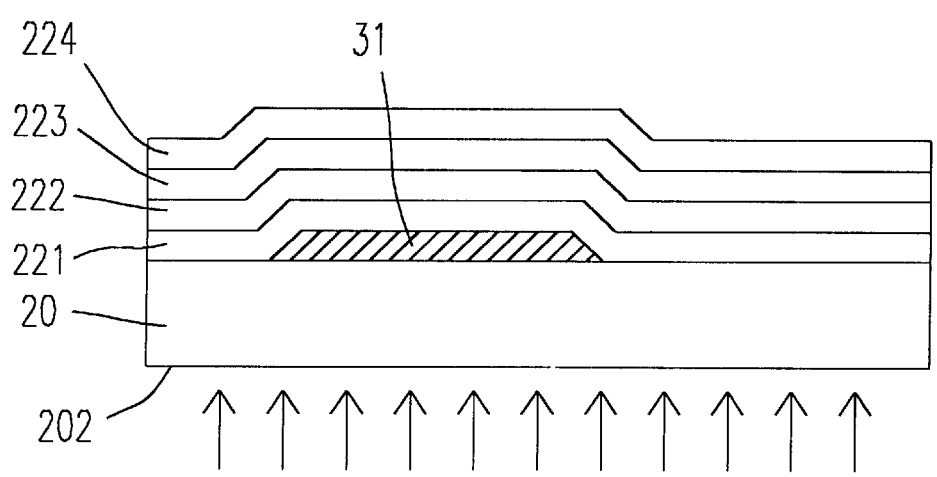
Figure 2D:
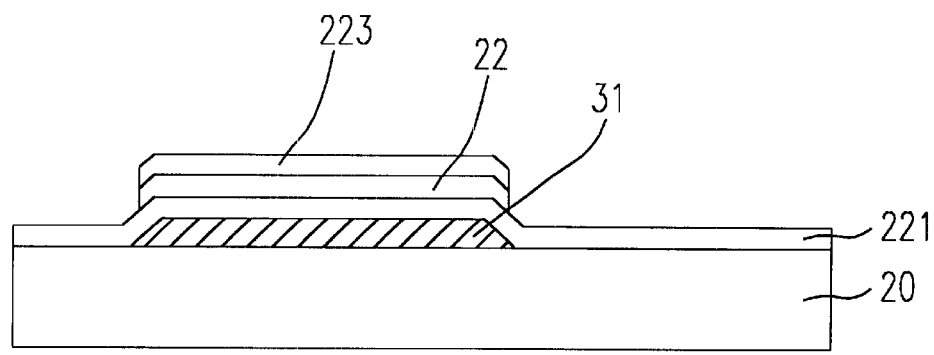
Figure 2E:
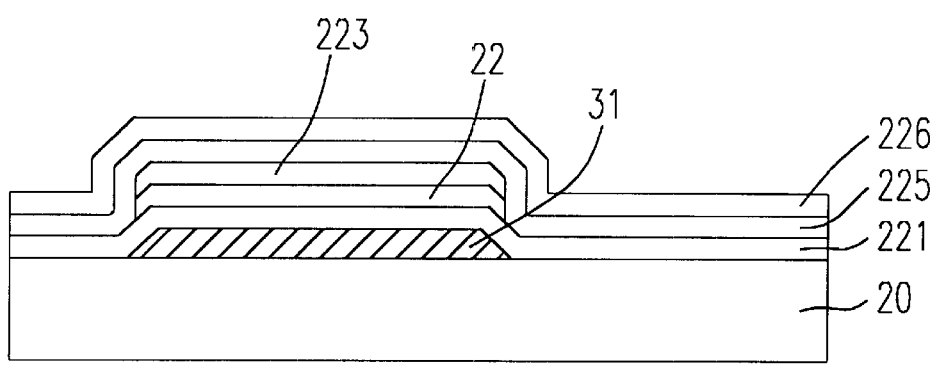
Figure 2F:
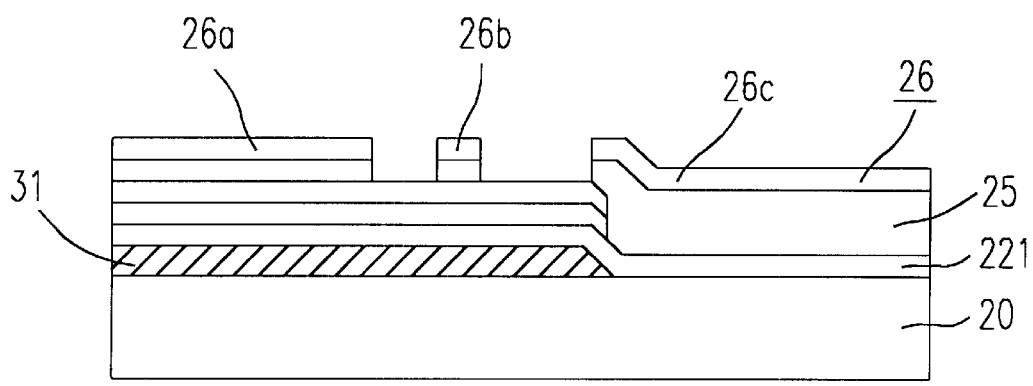
Figure 2G:
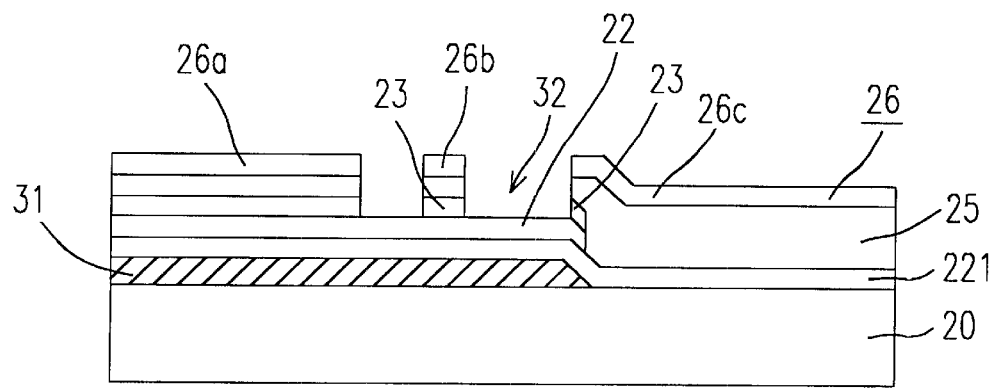
Figure 2H:
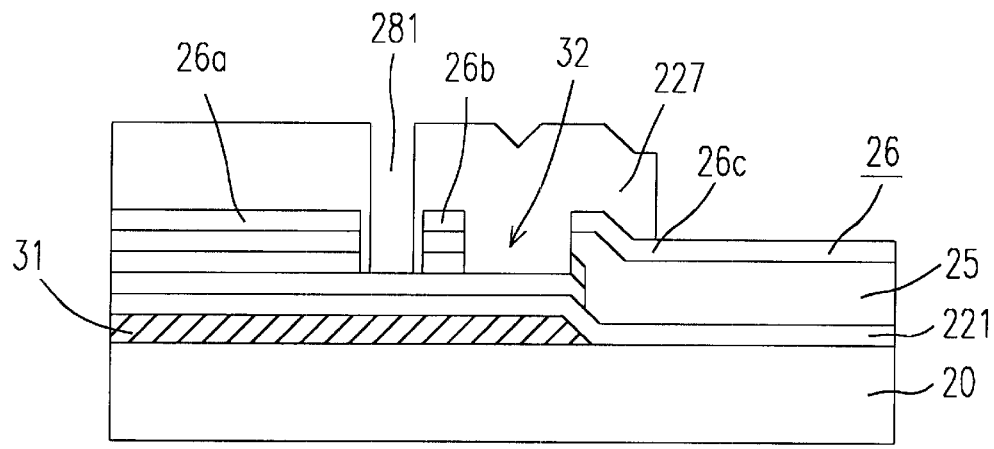
Figure 2I:
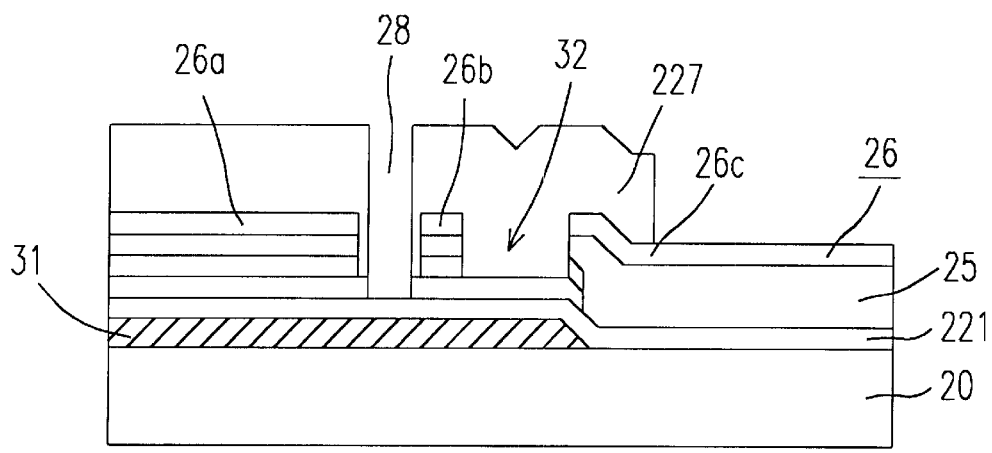
Figure 2J:
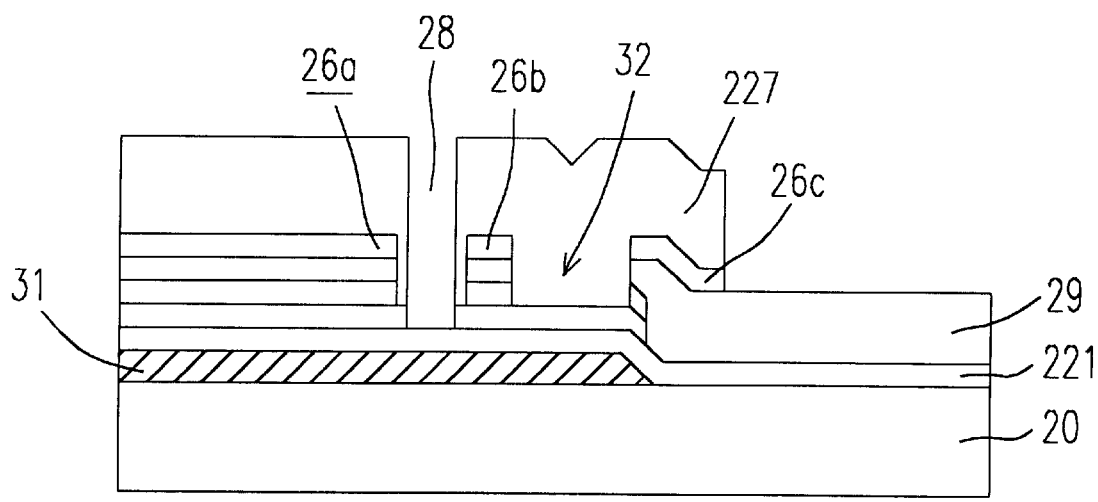
Figure 3A:
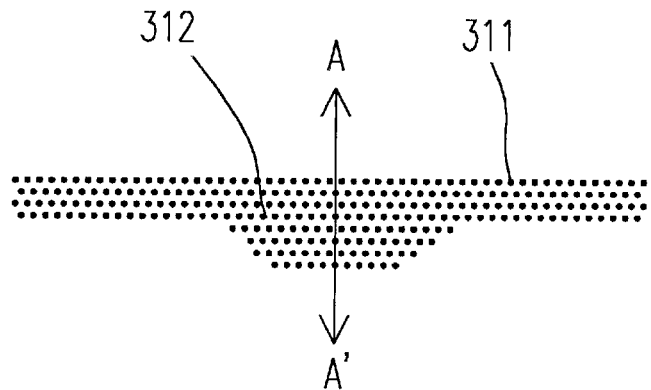
FIGS. 3A~3C are partial top plane views corresponding to the structures of FIGS. 2B, 2F and 2J, respectively.
Figure 3B:
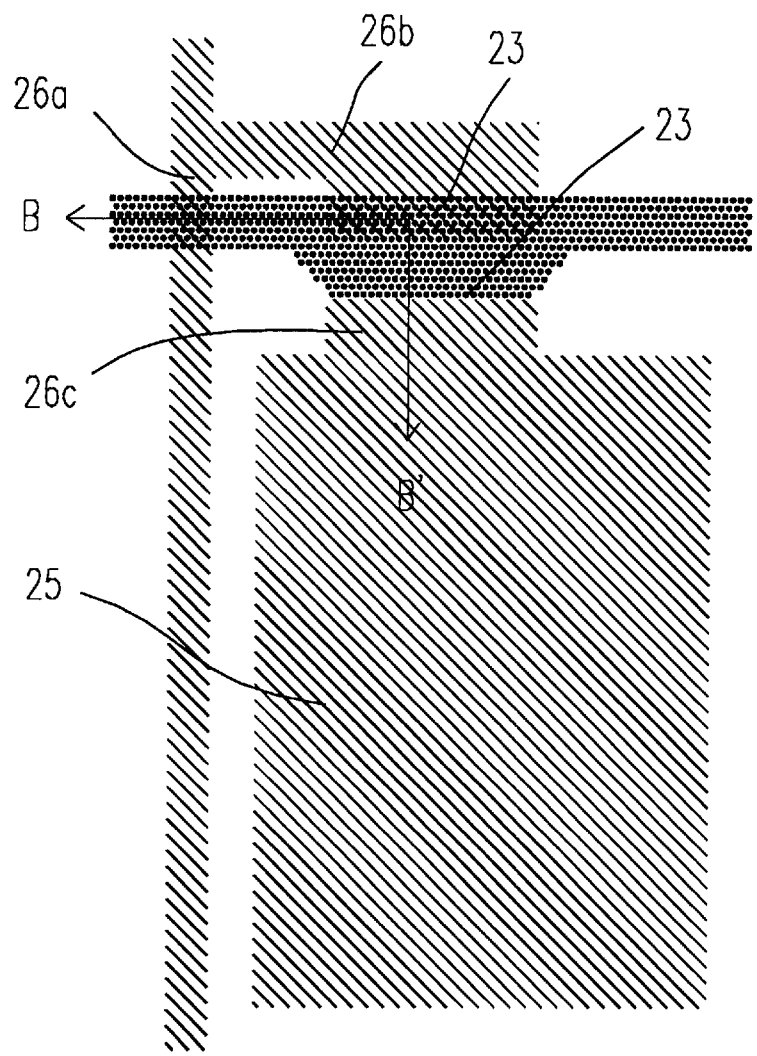
Figure 3C:
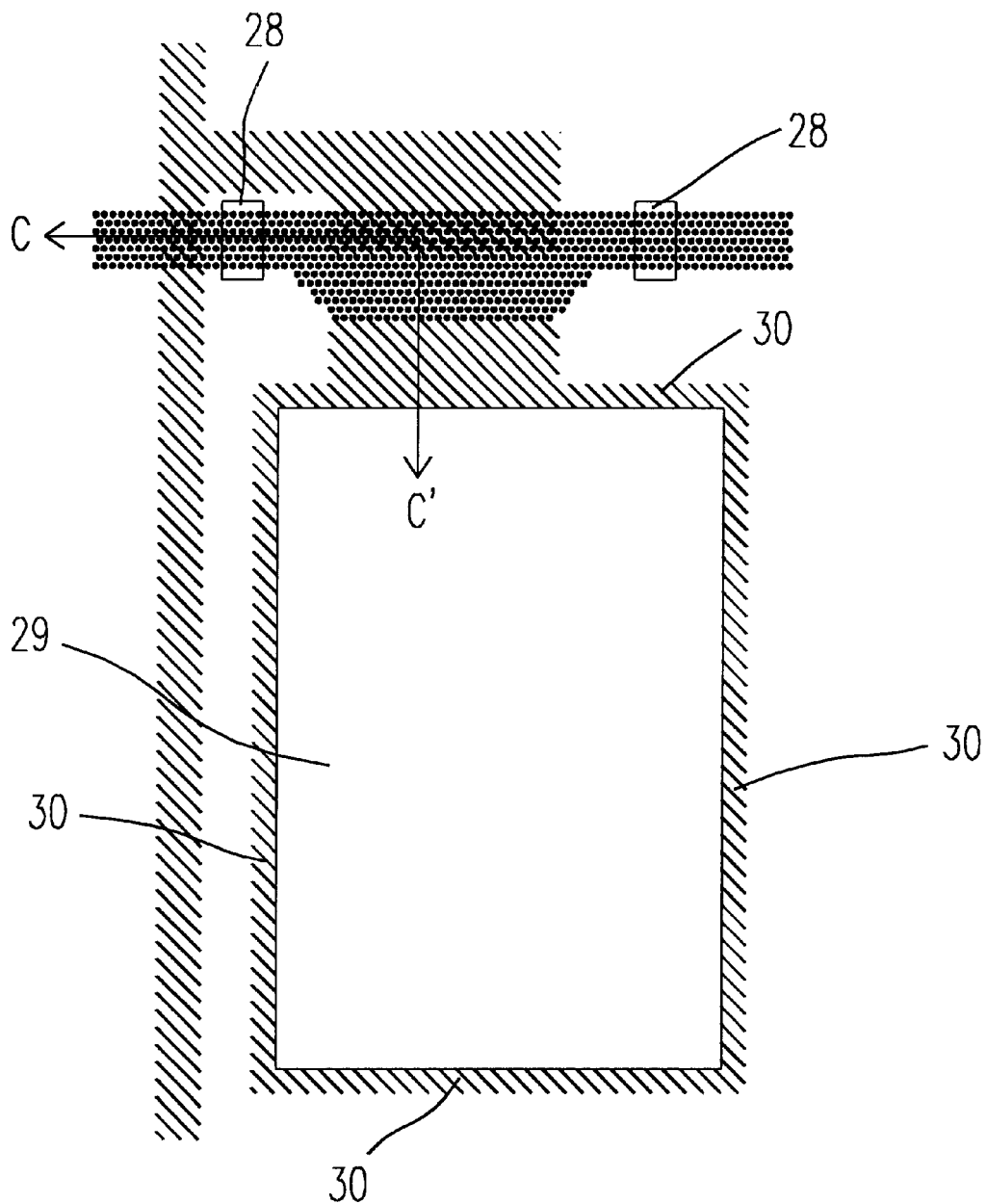
Figure 4:
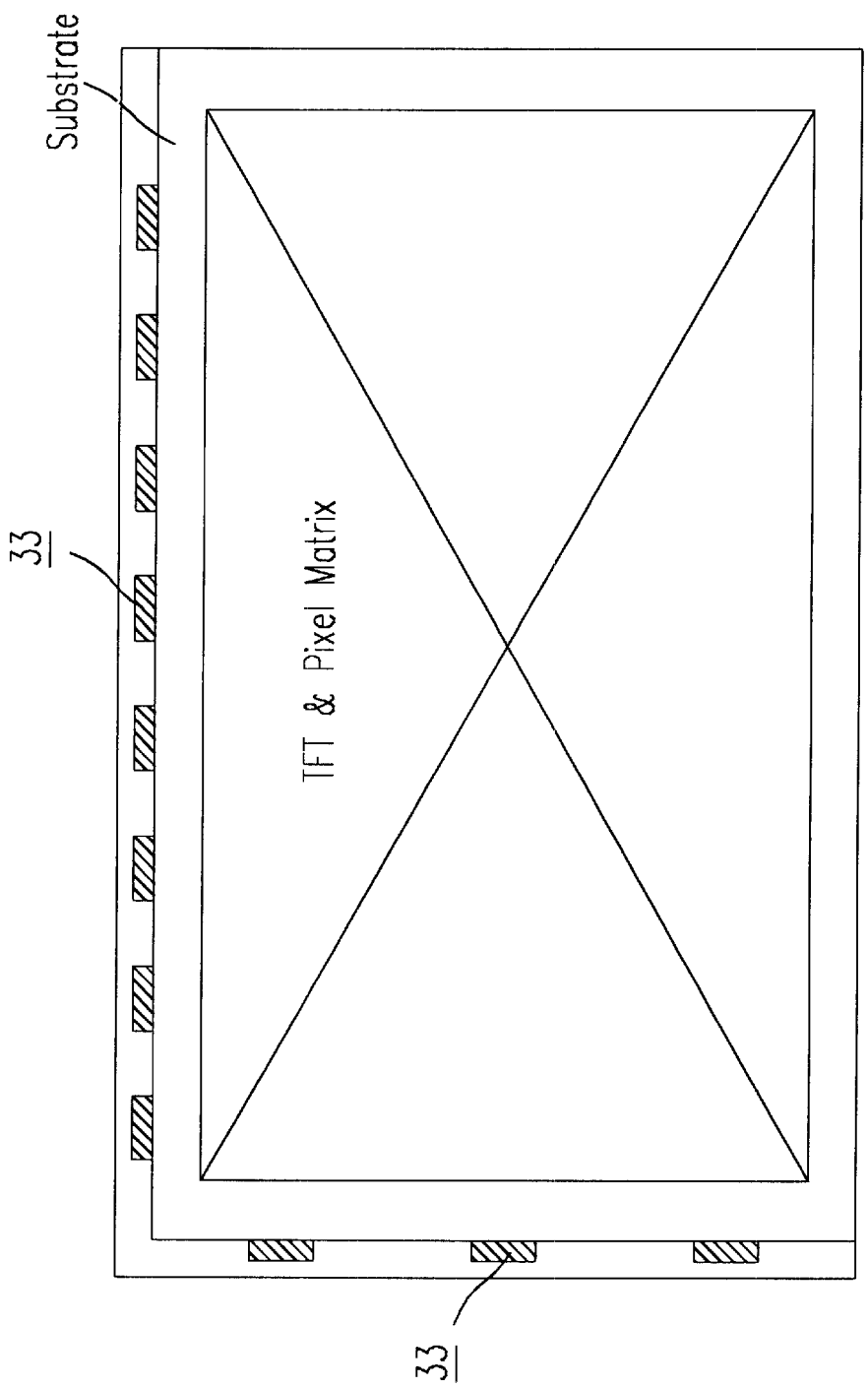
FIG. 4 is a partial top plane view schematically showing pad regions around the TFT matrix of a TFTLCD.

A preferred embodiment of a process for forming a TFT matrix of a TFTLCD according to the present invention directs to a three-mask process, and it is illustrated with reference to FIGS. 2A~2J. It is to be noted that the division of steps and the provision of serial numbers as below are for corresponding to the drawings, and for easy illustration and understanding, instead of critically indicating the separation or the integration of steps. The preferred embodiment of the process includes steps of:

i) applying a Cr layer 21 onto a front side 201 of a glass substrate 20 as a first conductive layer, as shown in FIG. 2A;

ii) using a first photo-masking and lithography procedure to pattern and etch the Cr layer 21 to form an active region 31 consisting of a scan line 311 and a gate electrode 312 of a TFT unit, as shown in FIGS. 2B and 3A wherein FIG. 2B is a cross-sectional view taken along the A—A line of FIG. 3A;

iii) consecutively and sequentially forming a silicon nitride layer 221 as an insulation layer, an intrinsic amorphous silicon (i-a-Si) layer 222 as a semiconductor layer, an $n^+$ amorphous silicon layer 223 as a doped semiconductor layer, and a photoresist 224 on the resulting structure of FIG. 2B, as shown in FIG. 2C, and exposing the resulting structure from the back side 202 of the substrate 20, as indicated by arrows, wherein a portion of the photoresist 224 above the region 31 is shielded by the region 31 from exposure so as to exhibit a self-aligned effect;

iv) etching off the exposed photoresist 224, portions of the semiconductor layers 223 and 222 thereunder, and the remaining photoresist so that the remaining structure of the semiconductor layers 222 and 223 has a shape similar to the region 31, as shown in FIG. 2D and with reference to FIG. 3A, and a channel region 22 is defined;

v) sequentially applying an ITO layer 225 and an Al layer 226 on the resulting structure of FIG. 2D as a transparent conductive layer and a second conductive layer, respectively, as shown in FIG. 2E;

vi) using a second photo-masking and lithography procedure to pattern and etch the ITO layer 225 and the Al layer 226 to define a pixel electrode region 25 and data and connection lines 26, respectively, as shown in FIG. 2F and with reference to FIG. 3B, wherein FIG. 2F is a cross-sectional view taken along the B—B line of FIG. 3B;

vii) using the remaining Al layer as a shield to etch off a portion of the $n^+$ amorphous silicon layer 223 to define source/drain regions 23, as shown in FIG. 2G where the TFT unit 32 is formed;

viii) applying a silicon nitride layer 227 on the resulting structure of FIG. 2G as a passivation layer, and using a third photo-masking and lithography procedure to pattern and etch the passivation layer 227 to define an isolation window area 281, expose a portion of the data and connection lines 26, as shown in FIG. 2H, and define tape automated bonding (TAB) openings as pad regions 33 around the TFT unit 32, as shown in FIG. 4;

ix) removing the i-a-Si layer 222 in the isolation window area 281 with the patterned passivation layer as shields to create an isolation window 28, as shown in FIG. 2I;

x) removing another portion of the Al layer 226 in the pixel electrode region 25 with the patterned passivation layer as shields to define a pixel electrode 29, as shown in FIG. 2J and with reference to FIG. 3C wherein FIG. 2J is a cross-sectional view taken along the C—C line of FIG. 3C.

In the step i) of the above embodiment, the first conductive layer 21 can be applied by any suitable conventional technique which is not to be redundantly described here. In this embodiment, the substrate 20 is formed of glass which is transparent for allowing light type of exposing source to transmit therethrough. The substrate 20, however, can also be made of another transparent, translucent or opaque material, depending on the type of the exposing source. On the other hand, the first conductive layer 21 can also be formed of molybdenum, tantalum molybdenum, tungsten molybdenum, tantalum, aluminum, aluminum silicide or copper.

In the step ii) of the above embodiment, the photo-masking and lithography procedure can be performed by any suitable conventional technique which is not to be redundantly described here.

In the step iii) of the above embodiment, the insulation layer 221, semiconductor layer 222, doped semiconductor layer 223 and photoresist 224 can be applied by any suitable conventional techniques which are not to be redundantly described here. The insulation layer 221 can also be formed of silicon oxide, silicon oxynitride, tantalum oxide or aluminum oxide. The semiconductor layer 222 can also be formed of micro-crystalline silicon or polysilicon. The doped semiconductor layer 223 can also be formed of highly doped micro-crystalline silicon or highly doped polysilicon.

In the step iv) of the above embodiment, the etching procedure can be performed by any suitable conventional technique which is not to be redundantly described here.

In the step v) of the above embodiment, the transparent conductive layer 225 and the second conductive layer 226 can be applied by any suitable conventional techniques which are not to be redundantly described here. The second conductive layer 226 can also be formed of chromium, molybdenum, tantalum molybdenum, tungsten molybdenum, tantalum, aluminum silicide or copper.

In the step vi) of the above embodiment, the photo-masking and lithography procedure can be performed by any suitable conventional technique which is not to be redundantly described here. The term "data and connection lines 26" used herein includes a data line 26a, a connection line 26b and an additional portion 26c, wherein the first connection line 26b connects the data line 26a with the TFT unit 32, and the connection line 26c connects the TFT unit 32 with the pixel electrode region 25.

In the step vii) of the above embodiment, the etching procedure can be performed by any suitable conventional technique which is not to be redundantly described here.

In the step viii) of the above embodiment, the passivation layer 227 can be applied by any suitable conventional technique which is not to be redundantly described here. The passivation layer 227 can also be formed of silicon oxynitride. On the other hand, the photo-masking and lithography procedure can be performed by any suitable conventional technique which is not to be redundantly described here. It is to be noted, however, that there preferably exists a high etching selectivity between the passivation layer 227 and the semiconductor layer 222 so that the etching procedure of the passivation layer will not damage the semiconductor layer. For example, when the passivation layer is made of silicon nitride, the etching gas for the passivation layer can be trifluoromethane ($CHF_3$). On the other hand, the etching gas for the semiconductor layer can be selected from a group consisting of carbon tetrafluoride ($CF_4$), boron trichloride ($BCl_3$), chlorine ($Cl_2$), sulfur hexafluoride ($SF_6$), or a mixture thereof.

In the step ix) of the above embodiment, the etching procedure can be performed by any suitable conventional technique which is not to be redundantly described here. It is to be noted that there preferably exists a high etching selectivity between the second conductive layer 226 and the semiconductor layer 222 so that the etching procedure of the sure semiconductor layer will not damage the second conductive layer under a proper etching recipe. On the other hand, the formation of the isolation window 29 and thus the definition of the isolation window area 291 are not essential to the TFT matrix. The high impedance of the channel region 22 may exhibit an isolation effect to some extent.

In the step x) of the above embodiment, the etching procedure can be performed by any suitable conventional technique which is not to be redundantly described here. In this step, the connection line 26c is further etched to leave a portion surrounding the pixel electrode 29 to serve as a black matrix 30.

From the above steps viii)~x), it is understood that the portion of the semiconductor layer 222 in the isolation window area 281, and the portion of the second conductive layer 226 in the pixel electrode region 25 are both removed with the patterned passivation layer as shields. The etching of the two portions of different material can be achieved by different etching recipe. On the other hand, the removal sequence of the two portions is not critical. In other words, the removal of the semiconductor layer 222 in the isolation window area 281 can be performed before or after that of the second conductive layer 226 in the pixel electrode region 25.

According to the process mentioned above, the definition of the channel region 22 is performed by a backside exposure technique as disclosed in the step iii), which uses the existent active region as shields so that one masking step is omitted. On the other hand, the transparent conductive layer is formed before the second conductive layer rather than after the passivation layer. Therefore, an additional masking and patterning procedure for creating the contact via for exposing the data and connection lines can be omitted. In other words, in this embodiment, only three masking and patterning procedures are required.

Furthermore, the connection line 26b between the TFT unit 32 and the data line 26a is integrally formed with the data line 26a so as to be of the same material as the data line 26a, i.e. Al in the illustrative embodiment. Therefore, the connection line 26b has a relatively low resistivity compared to the ITO connection line so as to be suitable for a large-area TFTLCD.

Moreover, there is an additional advantage by having the transparent conductive layer formed before the second conductive layer. After a portion of the second conductive layer is further removed after the third masking and patterning procedure, a remaining portion of the second conductive layer surrounding the pixel electrode can function as black matrix, as shown in FIG. 3C.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A process for forming a thin film transistor (TFT) matrix for a liquid crystal display (LCD), comprising steps of:

providing a substrate made of an insulating material;

forming a first conductive layer on a first side of said substrate, and using a first masking and patterning procedure to form a scan line and a gate electrode of a TFT unit;

successively forming an insulation layer, a semiconductor layer, a doped semiconductor layer, and a photoresist layer on said substrate with said scan line and said gate electrode;

providing an exposing source from a second side of said substrate opposite to said first side by using said scan line and said gate electrode as a shield to form an exposed area and an unexposed area;

removing said photoresist, said doped semiconductor layer, and said semiconductor layer of said exposed area so that a remained portion of said semiconductor and said doped semiconductor layers in said unexposed area has a specific shape substantially identical to the shape of said scan line together with said gate electrode;

successively forming a transparent conductive layer and a second conductive layer on said substrate with said semiconductor and said doped semiconductor layers of said specific shape, and using a second masking and patterning procedure to remove a portion of said second conductive layer and a portion of said transparent conductive layer to define data and connection lines and a pixel electrode region, respectively;

removing another portion of said doped semiconductor layer with a remaining portion of said second conductive layer as shields to define source/drain regions of said TFT unit;

forming a passivation layer on said substrate, and using a third masking and patterning procedure to remove a portion of said passivation layer; and removing another portion of said second conductive layer in said pixel electrode region with said patterned passivation layer as shields to define a pixel electrode.

2. The process according to claim 1 wherein said insulating material is a light-transmitting material, and said exposing source is a light radiation.

3. The process according to claim 2 wherein said light-transmitting material is glass.

4. The process according to claim 1 wherein said first conductive layer is formed of a material selected from a group consisting of chromium, molybdenum, tantalum molybdenum, tungsten molybdenum, tantalum, aluminum, aluminum silicide, copper and a combination thereof.

5. The process according to claim 1 wherein said insulation layer is formed of a material selected from a group consisting of silicon nitride, silicon oxide, silicon oxynitride, tantalum oxide, aluminum oxide, and a combination thereof.

6. The process according to claim 1 wherein said semiconductor layer is formed of a material selected from a group consisting of intrinsic amorphous silicon, micro-crystalline silicon and polysilicon.

7. The process according to claim 1 wherein said doped semiconductor layer is formed of a material selected from a group consisting of highly doped amorphous silicon, highly doped micro-crystalline silicon and highly doped polysilicon.

8. The process according to claim 1 wherein said transparent conductive layer is formed of a material selected from a group consisting of indium tin oxide, indium zinc oxide and indium lead oxide.

9. The process according to claim 1 wherein said second conductive layer is formed of a material selected from a group consisting of a chromium, molybdenum, tantalum molybdenum, tungsten molybdenum, tantalum, aluminum, aluminum silicide, copper and a combination thereof.

10. The process according to claim 1 wherein said passivation layer is formed of a material selected from a group consisting of silicon nitride and silicon oxynitride.

11. The process according to claim 1 wherein said third masking and patterning procedure additionally removes a portion of said semiconductor layer to define an isolation window.

12. The process according to claim 1 wherein said third masking and patterning procedure additionally defines a plurality of pad regions around said TFT matrix.

13. The process according to claim 1 wherein after said third masking and patterning procedure, a portion of said second conductive layer surrounding said pixel electrode remains as a black matrix.

* * * * *